Dec. 8, 1925.
C. J. HAYWARD
1,564,481
ADJUSTABLE BEARING FOR INTERNAL COMBUSTION ENGINES
Filed April 20, 1925
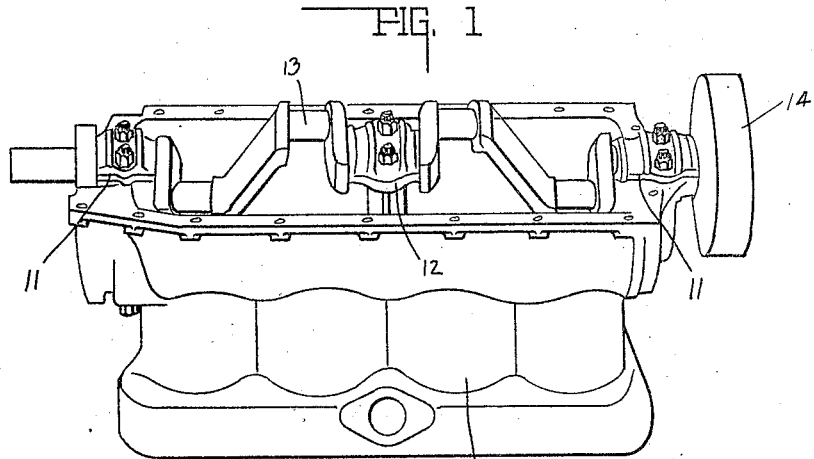
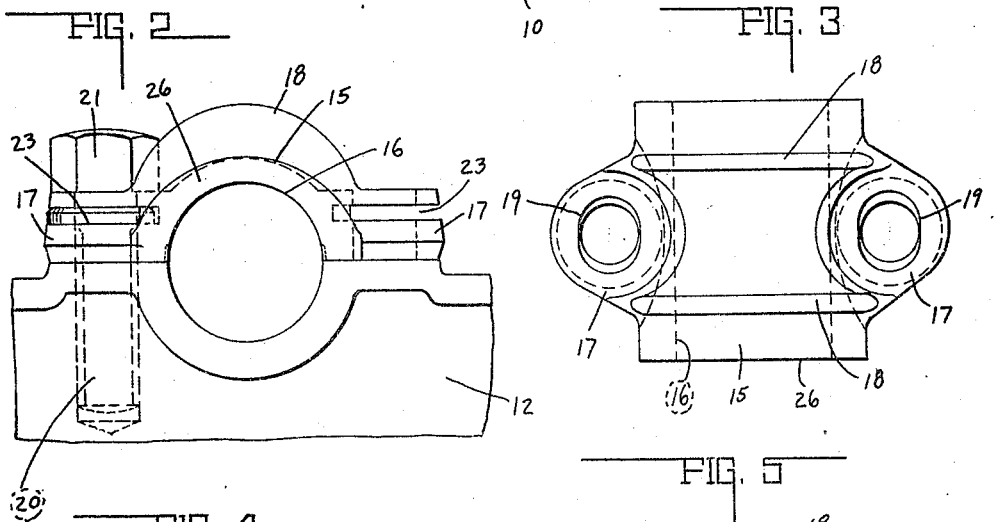
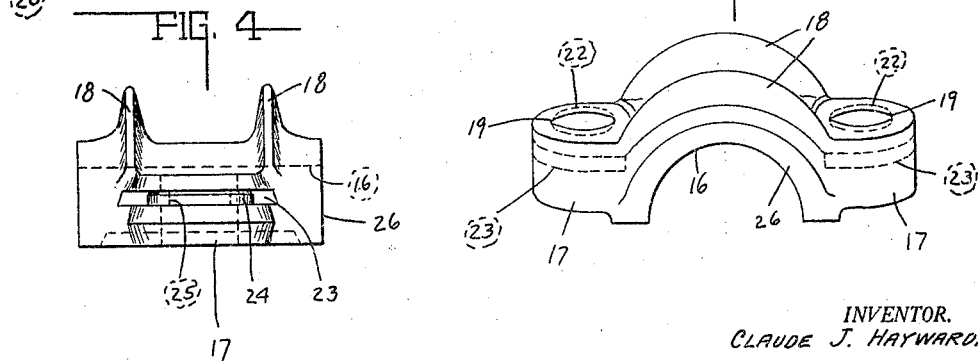
INVENTOR.
CLAUDE J. HAYWARD.
BY
ATTORNEYS.

Patented Dec. 8, 1925.

1,564,481

UNITED STATES PATENT OFFICE.

CLAUDE J. HAYWARD, OF BRAZIL, INDIANA.

ADJUSTABLE BEARING FOR INTERNAL-COMBUSTION ENGINES.

Application filed April 20, 1925. Serial No. 24,496.

*To all whom it may concern:*

Be it known that I, CLAUDE J. HAYWARD, a citizen of the United States, and a resident of Brazil, county of Clay, and State of Indiana, have invented a certain new and useful Adjustable Bearing for Internal-Combustion Engines; and I do hereby declare that the following is a full, clear, and exact description thereof, reference being had to the accompanying drawings, in which like numerals refer to like parts.

This invention relates to an adjustable bearing particularly adapted for a Ford engine and the like.

The chief object of the invention is to provide an adjustable bearing for the Ford crank-shaft. Since the Ford engine is equipped with a magneto included in the fly-wheel and the satisfactory operation of the magneto is dependent upon the spacing between the rotating and stationary parts of said magneto, it is necessary to take up the axial bearing wear in a Ford engine which prevents the movable part of the magneto construction from being positioned at a distance from the stationary parts which is necessary for satisfactory magneto operation.

In addition to the production of a novel adjustable bearing suitable for the accomplishment of the object before mentioned, another object of the invention is to form such a bearing from a standard bearing.

The chief feature of the invention consists in the provision of an adjustable bearing having suitable characteristics necessary to accomplish the foregoing object and the method of producing the same.

The full nature of the invention will be understood from the accompanying drawings and the following description and claim.

In the drawings Fig. 1 is a perspective view of a Ford cylinder block in inverted position and provided with a crank-shaft, fly-wheel and the adjustable bearing. Fig. 2 is a side elevational view of the improved bearing. Fig. 3 is a top plan view thereof. Fig. 4 is a side elevation thereof. Fig. 5 is a perspective view of a standard bearing showing the method of transformation.

In the drawings 10 indicates a cylinder block having an end bearing 11, the central bearing 12, the crank-shaft 13 with the fly-wheel 14. The main bearing 12 is herein shown provided with an adjustable cap indicated generally by the numeral 15, including a central or shaft receiving groove 16. Extending oppositely from said bearing cap is a pair of ears 17 connected by suitable reinforcement such as the ribbing 18. Each of the ears includes an opening 19 that extends transversely of the longitudinal axis of the groove and said openings 19 are in parallel relation with each other. A bolt 20 or stud carries a head or nut 21 and said bolt or stud 20 is receivable by the opening 19 to secure the cap 15 to the central bearing base 12. All of the foregoing is standard construction.

Reference will now be had to Fig. 5, in which the method of transforming a standard bearing into an adjustable bearing is illustrated. The holes 19 are elongated to form elliptical openings 22 with the major axis parallel with the groove axis. Each of the ears 17 is provided with a slot 23, which intersects and communicates with the elongated elliptical openings 22. This may be formed by milling said ear to form said slot substantially transverse to the opening 19. The resultant is an adjustable bearing with one addition.

The addition consists of a washer 24 having an opening 25 which receives the bolt or stud 20 as shown clearly in Fig. 2. The washer 24 is receivable by the slot 23 and has its opening 25 in registration with the elliptical openings 19—22.

In making the change the end bearing caps are loosened and the central bearing cap is removed and the adjustable bearing cap is replaced therefor. The crank-shaft is then adjusted longitudinally so that the magneto movable part included in the fly-wheel has the necessary clearance for satisfactory magneto operation. When so adjusted the adjustable bearing has its lateral face 26 engageable by the adjacent flange of the crank-shaft, and thus the crank-shaft, when the adjustable bearing is secured in the adjusted position, is maintained in the adjusted position. To maintain the bearing in the adjusted position it will be readily understood from the foregoing that clamping pressure exerted by the head or nut 21 of the bolt or stud, respectively, upon the two separated portions of the ear, separated by the slot 23, causes them to approach each other and clampingly engage the washer 24. The washer 24, however, is mounted upon the bolt positioned in the fixed opening in the base. The bolt or stud 20 when not tightened has longitudinal movement in the elliptical slot 19—22. Said longitudinal movement is prevented by clamping engagement of the portions of the slotted ear upon said washer which anchors the bolt to the bearing, and therefore, anchors the bearing to the base in the adjusted position.

In the foregoing description and in the following claim the terminology "bolt" is intended to include a bolt, stud or the like, and the word "ear" is intended to include a body portion of the bearing suitable for anchorage purposes, and the word "washer" is intended to include an element mounted upon the bolt and clampingly associated with the ear for positioning the bolt with respect to the ear.

The invention claimed is:

An adjustable bearing construction including a body portion having a shaft receiving groove and a flange abuttable laterally positioned face and an ear projecting from the body portion including an elongated and bolt receiving opening, the elongation being parallel to the groove longitudinal axis, said ear having a slot substantially transverse to said opening and communicating therewith, a bolt receiving washer receivable by said slot, and a clamping bolt receivable by the ear elongated opening and washer for anchorage in adjustable position by clamping action of the washer and the slotted ear.

In witness whereof, I have hereunto affixed my signature.

CLAUDE J. HAYWARD.